(No Model.)

L. B. PRAHAR.
CLASP.

No. 362,461. Patented May 3, 1887.

WITNESSES:
John H. Deemer
C. Sedgwick

INVENTOR:
L. B. Prahar
BY Munn & Co
ATTORNEYS.

UNITED STATES PATENT OFFICE.

LOUIS B. PRAHAR, OF BROOKLYN, NEW YORK.

CLASP.

SPECIFICATION forming part of Letters Patent No. 362,461, dated May 3, 1887.

Application filed February 18, 1887. Serial No. 228,077. (No model.)

*To all whom it may concern:*

Be it known that I, LOUIS B. PRAHAR, of Brooklyn, in the county of Kings and State of New York, have invented a new and useful Improvement in Clasps, of which the following is a full, clear, and exact description.

My invention relates to an improvement in spring-clasps, such as are used on pocket-books and similar articles; and the invention consists in forming the hinge piece or eye in connection with or as a part of the blank or piece of metal that constitutes the plate of the clasp, thus improving the hinge in point of durability and strength, and at the same time avoiding the expense and labor of soldering a separate hinge-piece to the plate.

The invention also consists in forming the tail-piece or lug against which the spring acts in one piece with the plate and hinge-eye.

Reference is to be had to the accompanying drawings, forming a part of this specification, in which similar letters of reference indicate corresponding parts in all the figures.

Figure 1:
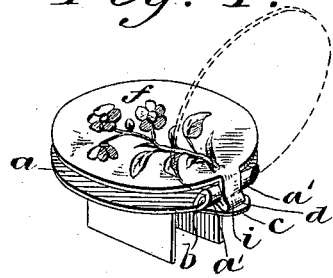
Figure 2:
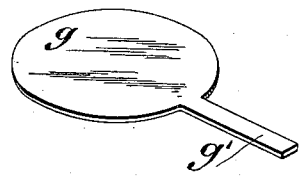
Figure 3:
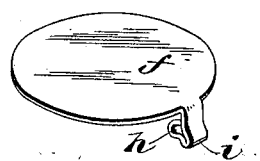
Figure 4:
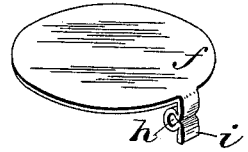

Figure 1 is a perspective view of a complete clasp made in accordance with my invention. Fig. 2 shows in perspective the blank for forming the plate and the eye and tail-piece for the hinge. Fig. 3 is a perspective view of the plate, hinge-eye, and tail-piece complete; and Fig. 4 is a similar view showing a modification of the hinge-eye and tail-piece.

The bottom plate, $a$, is of the usual construction, formed with the loops $a'$ $a'$, to receive the hinge-pin $b$, and provided with the spring $c$, riveted or otherwise secured to the plate $a$, to act upon the tail-piece $d$ of the hinge for holding the top plate, $f$, closed, as shown in full lines in Fig. 1, or open, as shown in dotted lines in said figure.

The top plate, $f$, is formed of a blank, $g$, stamped out in one piece with the narrow tang $g'$, of suitable length to form the hinge-eye $h$. The blank being formed, the tang $g'$ is first bent downward, then folded upon itself to form the projection or tail-piece $i$, then looped to form or complete the eye $h$, the end of the tang bearing against its inner surface near the under surface of the plate, as shown clearly in Fig. 3. In some instances the eye $h$ may be formed at the center of the tang, as shown in Fig. 4, in which case the end of the tang will be turned downward to form the tail-piece $i$, as clearly shown in said Fig. 4. In this manner it will be seen that the plate, hinge-eye, and tail-piece are all formed in one piece, and that all brazing or soldering are avoided.

Having thus fully described my invention, I claim as new and desire to secure by Letters Patent—

The top plate, $f$, stamped from sheet metal, integral with a tang, $g'$, which is bent to form the hinge-eye $h$ and tail-piece $i$, in combination with the bottom plate, $a$, loops $a'$, and spring $c$, secured to the bottom plate and arranged to act upon tail-piece $i$, substantially as described.

LOUIS B. PRAHAR.

Witnesses:
   H. A. WEST,
   C. SEDGWICK.